G. C. JENSEN.
LOCKING APPARATUS FOR LEVERS.
APPLICATION FILED SEPT. 27, 1917.
1,277,597.
Patented Sept. 3, 1918.
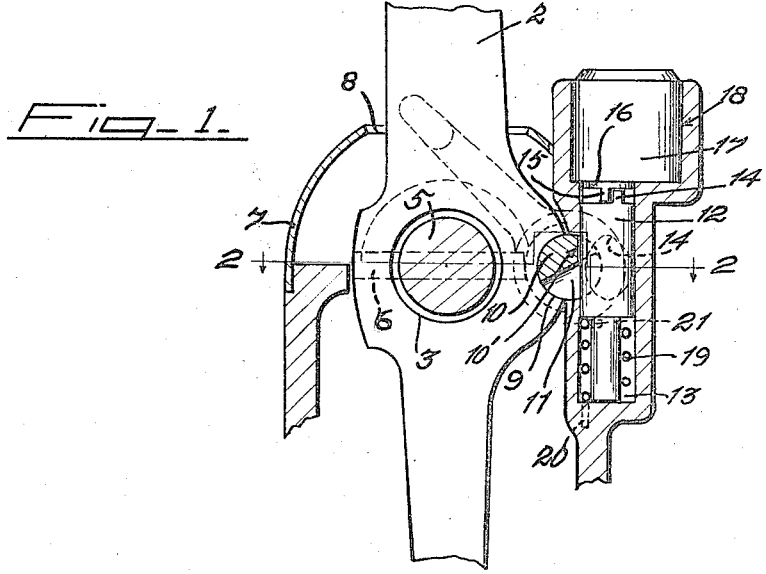
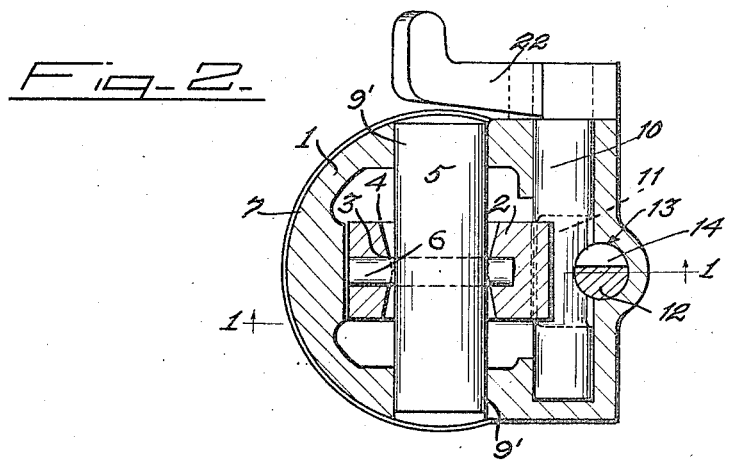
WITNESS:
Wm F. Drew
INVENTOR.
George C. Jensen
BY
Acker & Totten
ATTORNEYS.

UNITED STATES PATENT OFFICE.

GEORGE C. JENSEN, OF OAKLAND, CALIFORNIA.

LOCKING APPARATUS FOR LEVERS.

1,277,597.

Specification of Letters Patent.

Patented Sept. 3, 1918.

Application filed September 27, 1917. Serial No. 193,407.

*To all whom it may concern:*

Be it known that I, GEORGE C. JENSEN, a citizen of the United States, residing at Oakland, in the county of Alameda and State of California, have invented certain new and useful Improvements in Locking Apparatus for Levers, of which the following is a specification.

The present invention relates to an improved locking apparatus particularly designed for employment in connection with the gear shift lever of a motor driven vehicle, and has for its principal object to provide a construction which is capable of being incorporated with a lever mounted for lateral swinging movement relative to a supporting shaft, fulcrumed for pivotal movement at right angles to the axis of swinging movement of the lever. Another object, is to provide a construction which will lock the lever from what is commonly termed, selective or operative movements; to provide a lock controlled means adapted for automatic engagement with a locking bolt on the movement of said bolt to engage the lever.

With the above mentioned and other objects in view, the invention consists in the novel construction and combination of parts hereinafter described.

To more fully comprehend the invention, reference is directed to the accompanying drawings, wherein, Figure 1 is a vertical sectional view through the preferred embodiment of my invention, with a lever locking bolt and bolt locking pin in locking position.

Fig. 2 is a transverse sectional view taken on the line 2—2 of Fig. 1.

Referring more particularly to the several views of the drawings, wherein like characters of reference designate corresponding parts, 1, indicates a lever casing, tubular in form and upwardly through which, extends a suitable lever 2. The lever is provided with a transverse opening or bore 3, the walls of which taper as at 4, from the center of the opening outwardly toward the sides of said lever as in Fig. 2. Rotatably mounted at its ends in the casing 1, and extending transversely thereof through the opening 3, in the lever, is a supporting shaft 5, for said lever, and the lever is secured thereto by a pin 6, passing centrally transversely through said bore opening 3. It will be apparent that the movement of the lever forwardly and rearwardly is on the axis of rotation of said shaft 5, but that lateral movement of the lever is permitted by the flaring or tapering of the walls of the opening 3, from the center thereof toward each side of said lever, thus universal movement of the lever is provided. A lever casing cover 7, is positioned over the open top of the lever casing and the same is provided with an opening 8, through which the upper portion of the lever extends.

The lever is formed in its rear wall with a semi-circular cut-out or seat 9, extending in a plane parallel to said shaft 5, and within said cut-out 9, extends a lever locking bolt, fulcrumed at its ends as at 9′ for rotation in the lever casing 1. The lever locking bolt 10, is provided with a recess or depression 11, in the surface thereof, so positioned, and of such width and depth, that on the same registering with that portion of the lever adjacent the cut-out 9, in the lever, that the solid portion of said lever is capable of passing therethrough admitting of universal pivotal movement of the same. The solid portion of said lever locking bolt 10, is adapted on the rotation of the bolt to be received in said depression 9, and prevent either lateral movement of said lever on said pin, 6, or forward pivotal movement of the lever on the shaft 5; the locking of the lever is illustrated in Fig. 1 of the drawings. The lever locking bolt 10, is further provided on its surface with a semi-circular depression 10′ intersecting said depression 11, and arranged at approximately right angles thereto and said depression is adapted for receiving the solid portion of a bolt locking pin 12, disposed at right angles to said lever locking bolt 10, and rotatably mounted in a vertically disposed cylindrical recess 13, in the lever casing 1. The bolt locking pin is also provided on its surface with a semi-circular depression 14, adapted when in register with the lever locking bolt 10 to permit of free rotation of the same to locked and unlocked position. The upper portion of the bolt locking pin 12, is provided with a tongue 14, adapted to contact with a corresponding tongue 15, depending from the underside of a key-controlled locking barrel 16, rotatably mounted in a locking barrel casing 17, positioned in a suitable recess 18, in the upper portion of the lever casing 1. The rotation of the locking barrel 16, a one-quarter revolution in a counter-clockwise direction, causes the tongue 15, to engage its coöperating tongue 14, and to rotate the bolt locking pin 12, to position the cut-out 14 thereof in coöperation with the lever locking bolt 10, thus rotating the solid portion of the bolt locking pin from its recess in the bolt 10, and permitting the rotation of the lever locking bolt to admit of the solid portion thereof to be removed from the depression 9, in the lever, and be received in said depression 14, in the bolt locking pin, thus enabling the lever to be swung on its fulcrum. A spring 19, coiled about the lower portion of the bolt locking pin 12 is secured at one end, as at 20, to the lever casing 1, and at its opposite end is attached as at 21, to the bolt locking pin 12, causing a one-quarter revolution of the bolt locking pin on the movement of the lever locking bolt from locked to unlocked position relative to the lever, thus, it will be apparent, that on the locking of the lever from operative movement the bolt locking pin automatically locks said lever locking bolt in its locking position.

The rotation of the lever locking bolt 10, is easily accomplished by grasping the handle 22, connected to one end thereof which extends preferably exteriorly of the cast 1.

Having thus described my invention what I claim is:

1. In combination with a lever a shaft passing through the same and providing a fulcrum therefor and relative to which said lever is capable of lateral pivotal movement, said lever being provided in its surface in alinement with said shaft with a depression extending parallel to said shaft, a rotatable lever locking bolt disposed in a plane parallel with said depression and passing through the same to lock said lever from movement, said rotatable bolt being disposed parallel with said shaft and provided with a depression of a length equal to the width of the lever and adapted on the rotation of said bolt to permit passage therethrough of that portion of the lever adjacent said depression to admit of operative movement of the lever, a rotatable bolt locking pin arranged at right angles to said bolt and adapted for rotation to intersect the axis of rotation of said bolt when in its locked position, and a rotatable key-controlled locking barrel arranged in alinement with said locking pin and adapted for rotation to rotate said pin to permit movement of the bolt to unlocked position.

2. In combination with a tubular lever casing, a lever extended therethrough and provided with an opening therein, said opening increasing in diameter from its center to its opposite ends, a shaft passing through said opening and supporting the lever and providing a fulcrum therefor, a pin extending transversely through said opening at its center and passing through said shaft, said lever being provided with a depression in its outer surface adjacent to said shaft, said lever casing provided with a transverse bore intersecting the tubular portion thereof, a lever locking bolt disposed within said bore and capable of axial rotation therein for positioning the surface thereof within said depression to lock the lever from movement, said bolt being provided with intersecting depressions one adapted on the axial rotation of the bolt for registering with the depression in said lever to permit the surface of the lever to pass through the same, said casing being further provided with a bore open at one end and intersecting said locking bolt receiving bore, a rotatable bolt locking pin within said bore and provided in its surface with a depression, the said pin adapted for reception within the other depression in said bolt to lock the same from movement, and a lock controlled mechanism for rotating the pin in a reverse direction.

In testimony whereof I have signed my name to this specification in the presence of a subscribing witness.

GEORGE C. JENSEN.

Witness:
  D. B. RICHARDS.